United States Patent [19]
Wentworth et al.

[11] Patent Number: 5,651,639
[45] Date of Patent: Jul. 29, 1997

[54] METHOD AND APPARATUS FOR INSTALLATION OF UNDERGROUND PIPE

[75] Inventors: Steven W. Wentworth, Brookfield; Robert Crane, Oconomowoc, both of Wis.

[73] Assignee: Earth Tool Company, L.L.C., Oconomowoc, Wis.

[21] Appl. No.: 533,610

[22] Filed: Sep. 25, 1995

[51] Int. Cl.$^6$ .................................................. F16L 1/00
[52] U.S. Cl. ........................................................ 405/184
[58] Field of Search ................................. 405/138, 146, 405/150.1, 184; 175/53

[56] References Cited

U.S. PATENT DOCUMENTS

| | | | |
|---|---|---|---|
| 2,902,832 | 9/1959 | Levy et al. . | |
| 3,760,595 | 9/1973 | Stewart et al. | 405/184 |
| 4,000,879 | 1/1977 | Martin et al. . | |
| 4,319,648 | 3/1982 | Cherrington . | |
| 4,969,677 | 11/1990 | Melegari | 405/184 X |
| 5,220,964 | 6/1993 | Deken et al. . | |
| 5,302,053 | 4/1994 | Moriarty | 405/184 X |

FOREIGN PATENT DOCUMENTS

PCTWO95/ 07430  3/1995  European Pat. Off. .

OTHER PUBLICATIONS

TT Technologies catalog –pp. 28 and 29 Hammerhead Mole Accessories –Feb. 95', pp. 11–20.

*Primary Examiner*—William P. Neuder
*Attorney, Agent, or Firm*—Philip G. Meyers

[57] ABSTRACT

The invention provides an apparatus and a method for installing a pipe in a pre-bored hole. According to one aspect of the invention, the apparatus comprises a plug having a rear cylindrical portion with external threads engaged with internal threads of a front portion of a plastic pipe section. A front portion of the plug includes a pulling attachment, and a rear portion of the pipe section extends beyond the rear portion of the plug for attachment to a pipe to be towed through the hole. According to another aspect of the invention, the apparatus comprises a plug having a pulling attachment at a front end, a rear portion with external threads, a lengthwise external cutaway portion on the rear portion, and a slot extending radially through the rear portion. The lengthwise external cutaway portion forms an edge for cutting into an interior surface of a plastic pipe and the slot forms a suitable collection space for collecting pieces of plastic cut from the interior of the pipe by engagement of the threads. The invention also provides an apparatus and method for simultaneously installing several underground pipes in a pre-bored hole. This apparatus comprises a mounting plate having a generally flat plate including a plurality of spaced, crucifix-shaped openings extending through the plate. Several pulling devices can be secured to the mounting plate by sliding a plurality of chains, each chain attached to one pulling device, into one of the openings.

17 Claims, 4 Drawing Sheets

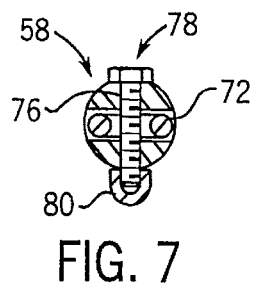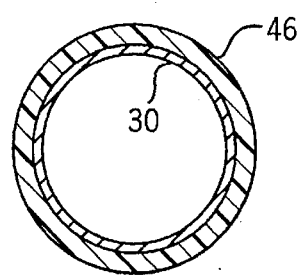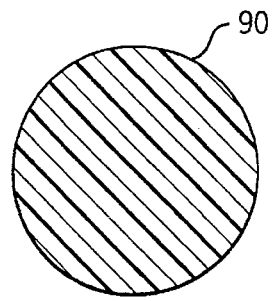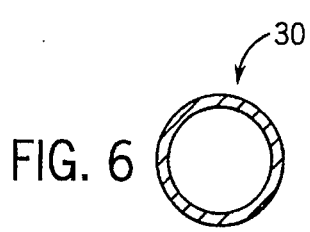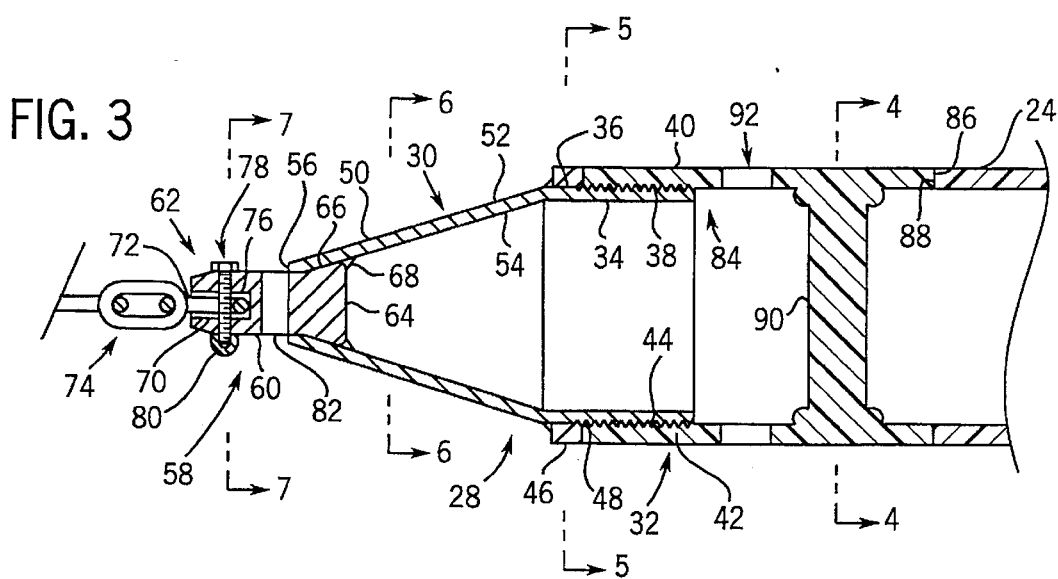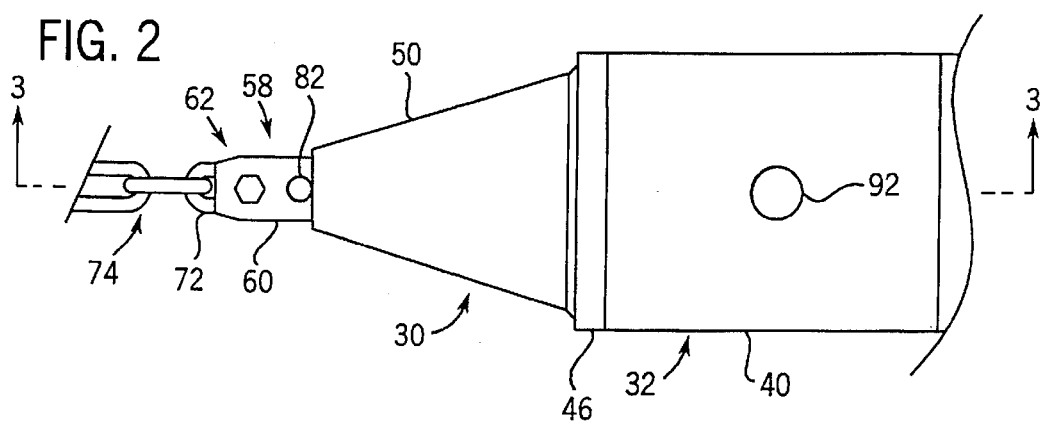

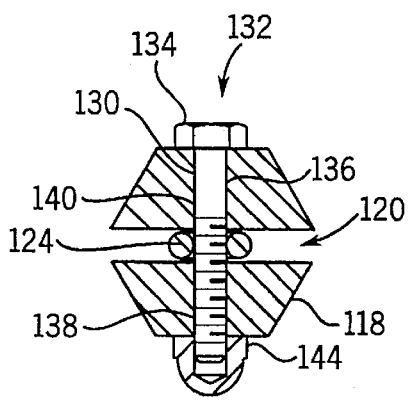
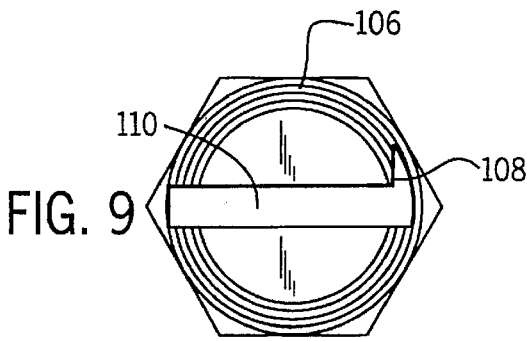
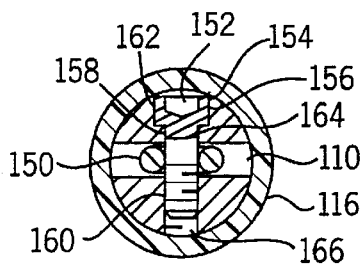
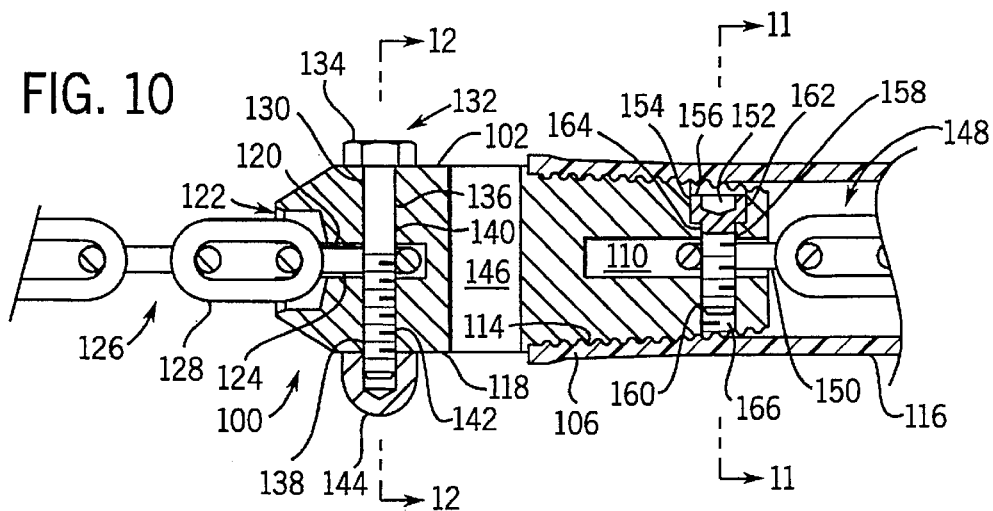
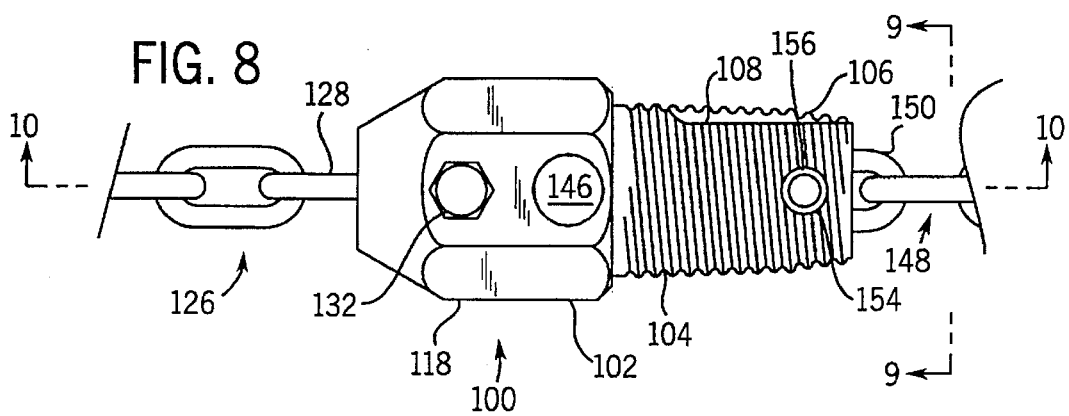

METHOD AND APPARATUS FOR INSTALLATION OF UNDERGROUND PIPE

TECHNICAL FIELD

This invention relates to directional boring, particularly to an apparatus and method for installing pipes within a pre-bored underground pilot bore.

BACKGROUND OF THE INVENTION

Directional boring apparatus for making small diameter or pilot holes through soil are well known. Upon completion of the pilot bore hole using a drill rod, a plastic pipe may be installed by pulling the pipe back through the hole. A known pulling operation includes the steps of securing a plug within the front end opening of the pipe, attaching the plug to a backreamer, attaching the backreamer to the drill rod, and then pulling the drill rod and attached assembly through the hole. In this manner, the backreamer will both enlarge and smooth the hole ahead of the pipe.

Securing the plug within the front end of the pipe may be done in several ways, such as by threaded engagement. However, threading of the plug within the pipe is often difficult to do, especially for pipes of large diameter. For small diameter plastic pipes, it is known to provide a plug with self-taping threads having a lengthwise cut for creating a cutting edge. Even so, cuttings produced by the threading operation may remain in the lengthwise cut and between the threads, inhibiting the threading operation. For larger plastic pipes, it is often simply not possible for a worker to generate the torque necessary to secure the self-taping plug within the pipe, and alternative methods must be used.

For some types of pipe installation, such as when using a self-propelled pneumatic mole, it is known to provide a pulling chain extending through the length of pipe being installed. In particular, the pulling chain attaches to a rear end of the mole at a front end of the pipe, and extends through the pipe to a tensioner frame at the rear end of the pipe. With this arrangement, the pipe remains securely clamped to the rear of the mole during the pulling operation.

It is often desirable to install several pipes in a side-by-side arrangement with a single pulling operation. For this operation, a variety of devices are known for coupling multiple pipes to a single puller. However, these known coupling devices all require the use of a tool for attaching and detaching the pipes from the puller, which takes time. A device for securing multiple pipes to a puller without the need for a tool would be desirable.

SUMMARY OF THE INVENTION

The present invention provides an apparatus and method for installing an underground pipe in a hole. More particularly, the invention provides an apparatus for towing a pipe through the ground behind a puller, and a method of using the apparatus to install one or more pipes in the hole.

According to one aspect of the invention, an apparatus comprises a plug having a rear cylindrical portion with external threads and a plastic pipe section having a front portion with internal threads. The front portion of the pipe section is secured around the rear portion of the plug by engaging the internal threads of the pipe section with the external threads of the plug. A front portion of the plug is configured for attachment to a puller, and a rear portion of the pipe section extends beyond the rear portion of the plug for attachment to a pipe to be towed through the hole. The internal threads of the pipe section are precut prior to coupling with the plug to ensure a strong and secure engagement between the plug and the pipe section.

A method for installing pipe in a hole using the foregoing assembly of a plug and pipe section includes the steps of forming internal threads at a front end of a plastic pipe section, fusing a rear end of the pipe section to a front end of the pipe to be towed, installing a plug having external threads within the pipe section, attaching a front portion of the plug to a pulling device, and pulling the pipe into the hole. According to a preferred aspect of the invention, the method may further includes the step of pressurizing the pipe to test for leaks.

According to another aspect of the invention, pipe towing plug has a rear portion with external threads, a lengthwise external cutaway portion on the rear portion, and a first slot extending radially through the rear portion. The lengthwise external cutaway portion forms an edge for cutting into an interior surface of a plastic pipe. The first slot forms a suitable collection space for collecting pieces of plastic cut from the pipe when the external threads engage with the interior surface of the plastic pipe. A front portion of the plug is configured for attachment to a first pulling device. According to a preferred aspect of the invention, the rear portion of the plug is configured for attachment to a second pulling device, so that the plug can be connected to a pulling device from both ends.

According to yet another aspect of the invention, an apparatus is provided for simultaneously installing several side-by-side pipes in a pre-bored hole. This apparatus comprises a mounting plate having a plurality of spaced, crucifix-shaped openings extending therethrough. Each opening is configured to allow passage of a chain at a first portion and to prevent passage of the chain at a second portion, the second portion rearward of the first portion. In this way, a chain may be easily secured to or removed from the mounting plate without any tools and, yet, will remain securely trapped in the mounting plate during the pulling operation.

According to another aspect of the invention, a method is provided for installing a pipe in a pre-bored hole using a pipe plug. This method comprises mounting the plug into a front end of a plastic pipe, attaching a first pulling device such as a chain to a front portion of the plug, attaching a second pulling device to a rear portion of the plug, extending the second pulling device through the interior of the pipe, and securing the second pulling device under tension to a rigid plate disposed against a rear end of the pipe. Finally, pulling the backreamer draws the pipe into the hole behind the backreamer.

According to a further aspect of the invention, a method is provided for simultaneously installing several underground pipes in a pre-bored hole. This method comprises positioning a pulling device, such as a backreamer, in the hole. The backreamer or puller is connected to a generally flat, rearwardly extending mounting plate. The mounting plate has a number of spaced openings extending through the plate. The method further comprises securing a front end of each plastic pipe to a rear portion of a plug, attaching a pulling chain to a front portion of each plug, and securing each chain to the mounting plate by sliding it into one of the openings. Finally, pulling the backreamer draws the pipes side by side into the hole behind the backreamer. The openings are preferably the crucifix-shaped openings described above.

Other objects, features and advantages of the invention will become apparent from the following detailed description. It should be understood, however, that the detailed description is given by way of illustration only, since various changes and modifications within the spirit and scope of the invention will become apparent to those skilled in the art from this detailed description.

BRIEF DESCRIPTION OF THE DRAWING

The invention will hereafter be described with reference to the accompanying drawing, wherein like numerals denote like elements, and:

FIG. 2 is a partial top view of a first embodiment of a puller apparatus secured to a pipe to be towed according to the invention;

FIG. 3 is a lengthwise sectional view of the puller of FIG. 2, taken along line 3—3;

FIG. 4 is a cross-sectional view of the puller of FIG. 3, taken along line 4—4;

FIG. 5 is a cross-sectional view of the puller of FIG. 3, taken along line 5—5;

FIG. 6 is a cross-sectional view of the puller of FIG. 3, taken along line 6—6;

FIG. 7 is a cross-sectional view of the puller of FIG. 3, taken along line 7—7;

FIG. 8 is a lengthwise top view of a second embodiment of a puller apparatus shown prior to securing to a pipe to be towed according to the invention;

FIG. 9 is a rear end view of the puller of FIG. 8, with the chain removed;

FIG. 10 is a lengthwise side sectional view of the puller of FIG. 8, taken along line 10—10, with the puller shown secured within a pipe to be towed;

FIG. 11 is a cross-sectional view of the puller of FIG. 10, taken along line 11—11;

FIG. 12 is a cross-sectional view of the puller of FIG. 10, taken along line 12—12;

DETAILED DESCRIPTION OF PREFERRED EMBODIMENTS

Figure 1:
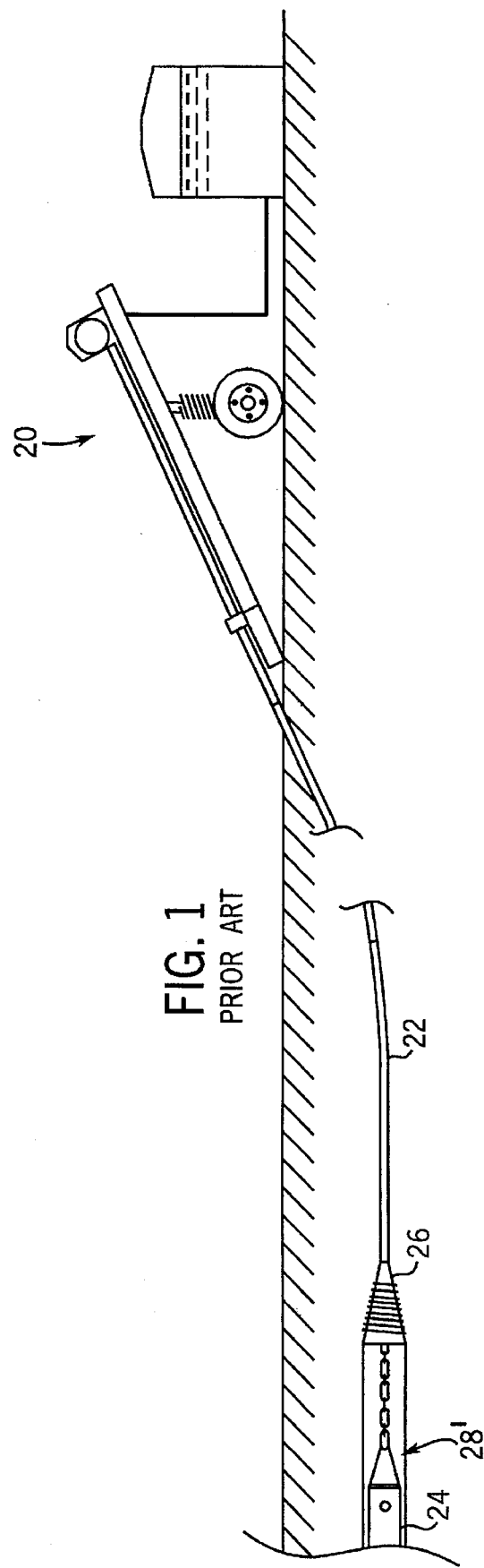
FIG. 1 is a schematic diagram of a directional boring apparatus being used in a pulling operation according to a known method.

FIG. 1 shows a conventional directional boring apparatus 20 for making small diameter or pilot bore holes through soil. In directional boring, the initial hole is made by pushing a drill rod 22 only through the soil. Upon completion of the hole, a pipe 24 is attached to drill rod 22 so that, when drill rod 22 is returned, pipe 24 is installed in the hole. Drill rod 22 is attached to a backreamer 26, and backreamer 26 is attached to a puller plug 28' by a chain as shown. Plug 28' is secured within pipe 24, e.g., by threaded engagement with the wall of pipe 24.

FIGS. 2 through 7 show a first embodiment of a pulling apparatus 28 of the invention which can be used in the basic method shown in FIG. 1. As best seen in FIG. 3, pulling apparatus 28 comprises a hollow plug 30 secured to a plastic pipe section 32. Plug 30 includes a rear cylindrical portion 34 having an outer surface 36 with a diameter slightly less than the diameter of an inner surface 38 of a front portion 40 of pipe section 32. Rear portion 34 is provided with coarse external threads 42 on outer surface 36, and front portion 40 has matching internal threads 44 on inner surface 38. Preferably, internal threads 44 are machined into pipe section 32 prior to securing plug 30, which eliminates thread load during installation of plug 30, resulting in a lower install torque. Plug 30 may also include a collar 46 positioned around outer surface 36 of rear cylindrical portion 34. More specifically, collar 46 is secured near a forward end 48 of external threads 42, and acts as a positive stop for pipe section 32. Pipe section 32 should match the diameter of the pipe to be installed and has a relatively short length, for example, from about 0.5 to 5 feet.

Plug 30 includes a front portion 50 having a frontwardly tapering, generally frustoconical outer surface 52, an frustoconical inner surface 54, a reduced diameter front opening 56, and a head 58 or similar means secured within front opening 56 for attaching plug 30 to backreamer 26. Preferably, attachment head 58 comprises a rod 60 having a clevis 62 located forwardly of front opening 56, and an enlarged rear potion 64 located rearwardly of front opening 56, i.e., in the interior of plug 30. Preferably, enlarged rear portion 64 includes a frontwardly tapering, generally frustoconical outer surface 66 configured to closely match inner surface 54 of front portion 50 of plug 30, which retains head 58 in opening 56. Rod 60 may be mechanically secured within front opening 56 by any suitable method, such as by welding, as indicated at 68.

Clevis 62 comprises a frontwardly opening slot 70 for accepting a link 72 of a chain 74, an outwardly opening, radially extending clevis hole 76, a pin 78 positioned within clevis hole 76, and a nut 80 to secure link 72 within clevis 62. Preferably, rod 60 also includes an outwardly opening, radially extending torque hole 82 for accepting a torque rod (not shown), positioned between clevis hole 76 and front opening 56.

When plug 30 is secured within pipe section 32, a rear portion of pipe section 32 extends rearwardly of plug 30, thus forming an extending rear portion 84. Pipe section 32 is preferably made of a material that is easily and reliably welded to pipe 24 to be towed, such as plastic. However, any material which is suitable for site welding to PVC or PE pipe can be used. As described more fully below, a rear end 86 of extending rear portion 84 may be welded to a front end 88 of pipe 24, allowing pipe 24 to be towed into the hole.

Rear portion 84 preferably includes a radial wall 90 located in the interior of pipe section 32, rearwardly of internal threads 44. Interior wall 90 thus forms a seal permitting pressurization of a portion of the interior of pipe section 32 rearwardly of wall 90. Since interior wall 90 is preformed in pipe section 32, pressure testing of pipe 24 is possible immediately after installation.

It is also preferable that extending rear portion 84 include an outwardly opening, radially extending torque hole 92 configured for accepting a torque bar (not shown), positioned rearwardly of internal threads 44 and forwardly of radial wall 90. Insertion of a torque rod in torque hole 92 allows for higher torque during installation of plug 30 into pipe section 32 and, therefore, results in a tighter fit.

The invention also provides a method of using apparatus 28 to install pipe 24 in a hole. To start with, internal threads 44 are cut into inner surface 38 of plastic pipe section 32, and rear end 86 of pipe section 32 is fused to front end 88 of pipe 24 to be towed. Then, plug 30 is secured by external threads 42 to internal threads 44 of pipe section 32. Next, front portion 50 of plug 30 is secured by clevis 62 to link 72 of chain 74, chain 74 is secured to backreamer 26, and backreamer 26 is pulled to install pipe 24 in the hole. After pipe 24 is installed, pipe 24 may be pressure tested for leaks. Finally, pipe section 32 is sawed off, allowing apparatus 28 to be reused.

Referring now to FIGS. 8 through 12, a second embodiment of a pulling apparatus 100 comprises a plug 102 having a rear cylindrical portion 104 with external threads 106, a lengthwise external cutaway portion 108 on rear portion 104, and a first, rearwardly facing slot 110 extending radially through rear portion 104. Lengthwise external cutaway portion 108 forms an edge 112 for cutting into an interior surface 114 of a plastic pipe 116 being towed into the hole. First slot 110 forms a suitable collection space for collecting pieces (not shown) of plastic cut from pipe 116 when external threads 106 engage with interior surface 114 of pipe 116.

Plug 102 includes a front portion 118 having a second, frontwardly opening slot 120 spaced from and substantially coplanar with first slot 110, and a frontwardly opening hole 122 centered on second slot 120. Second slot 120 is slightly wider than the thickness of a link 124 of a first pulling chain 126, and hole 122 has a diameter larger than the width of link 124. Further, second slot 120 has a length about equal to the length of link 124, and blind hole 122 has a depth just sufficient to provide clearance for a second link 128 within blind hole 122 when first link 124 is fully inserted in second slot 120. For securing chain 126 to pulling apparatus 100, front portion 118 of plug 102 includes an outwardly opening, radially extending hole 130 which intersects second slot 120, and a fastener such as a threaded bolt 132 inserted through hole 130 and link 124.

Bolt 132 has a head 134, a shank 136, and a threaded end 138 opposite head 134. Radially extending hole 130 includes an unthreaded portion 140 and a threaded portion 142. Unthreaded portion 140 has a sufficient diameter to accept threaded end 138 and shank 136, but not large enough to accept headed end 134. Threaded portion 142 is of a diameter and thread pattern for engagement with threaded end 138 of fastener 132. After fastener 132 is threaded into hole 130, fastener 132 is secured in place by an acorn (or jam) nut 144. Preferably, front portion 118 of plug 102 also includes an outwardly opening, radially extending hole 146 for accepting a torque rod (not shown), positioned rearwardly of second slot 120.

According to a preferred embodiment, rear portion 104 of plug 102 is configured for attachment to a second puller chain 148. In particular, first slot 110 is of sufficient width and length to receive a link 150 of second puller chain 148. For securing second puller chain 148 to plug 102, rear portion 104 further includes a outwardly opening, radially extending hole 152 which intersects perpendicularly with first slot 110, and a bolt 154 positioned through hole 152 and link 150. Bolt 154 includes a head 156, a shank 158, and a threaded end 160 opposite head 156. Hole 152 includes a first unthreaded portion 162 having a diameter and depth sufficient to completely receive headed end 156 of bolt 154, a second unthreaded portion 164 having a diameter large enough to receive shank 158 of bolt 154, and a threaded portion 166 of a diameter and thread pattern to engage threaded end 160 of bolt 154. Bolt 154 is shorter than the length of hole 152, so that bolt 154 is completely countersunk within hole 152 when chain 148 is secured in within first slot 110.

A method for installing pipe 116 in a pre-bored hole using pulling apparatus 100 comprises threading rear cylindrical portion 104 of plug 102 into interior surface 114 of pipe 116, and attaching first pulling chain 126 within second slot 120 on front portion 118 of plug 102. The method further includes attaching second pulling chain 148 within first slot 110 on rear portion 104 of plug 102, extending second pulling chain 148 through the interior of pipe 116, and securing second pulling chain 148 under tension to a rigid plate (not shown) disposed against a rear end of pipe 116. Finally, applying a pulling force to first pulling chain 126 pulls pipe 116 into the hole.

Figure 13:
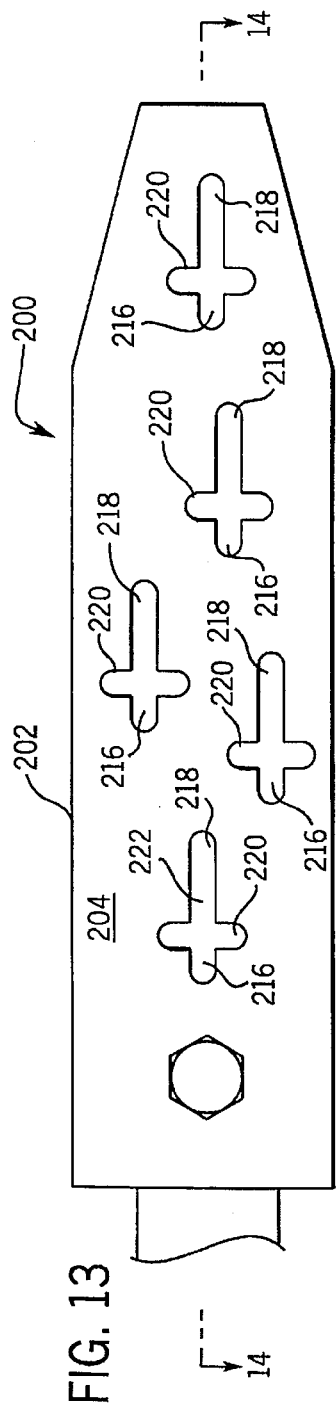
FIG. 13 is a side view of a mounting apparatus according to the invention.
Figure 14:
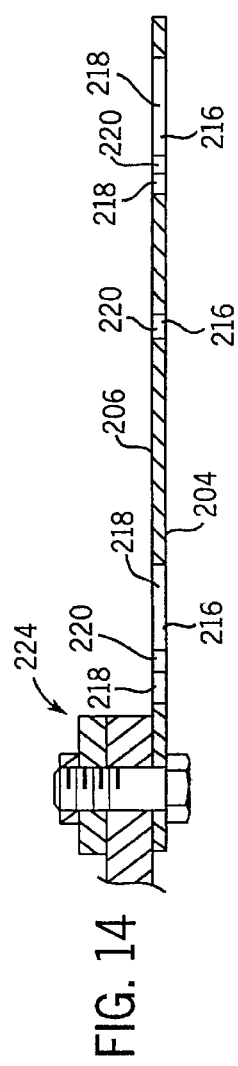
FIG. 14 is a cross-sectional top view of the mounting apparatus of FIG. 13, taken along line 14—14.
Figure 15:
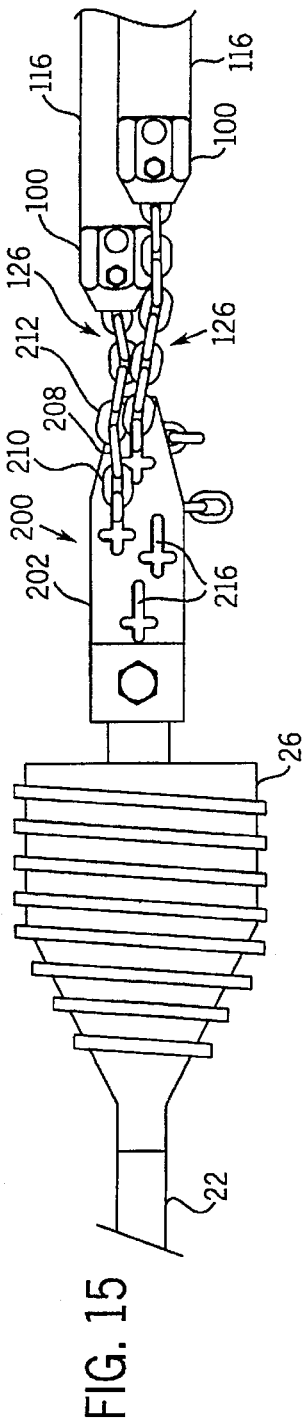
FIG. 15 is a lengthwise view of the mounting apparatus of FIG. 13, shown in a method of use.

FIGS. 13–15 show a mounting apparatus 200 for simultaneously installing several side-by-side pipes in a pre-bored hole. Apparatus 200 comprises a generally flat mounting plate 202 having a front, generally planar surface 204, and a back, generally planar surface 206. Preferably, back surface 206 is generally parallel with front surface 204. The particular shape of each planar surface 204, 206 is not important, so long as a sufficient surface area is provided to attach a desired number of chains 126, as will be more clear below. The distance between front surface 204 and back surface 206 is preferably about the thickness of a link 208 of chains 126, but may be as great as the closest distance between two links that are separated by an intermediate link, e.g., the distance between links 210 and 212 when separated by link 208.

Flat plate 202 includes a plurality of spaced, crucifix-shaped openings 216 extending from front surface 204 to back surface 206. More specifically, each opening 216 is formed by a long slot 218 extending in a lengthwise direction and a short slot 220 extending in a widthwise direction, with long slot 218 bisecting short slot 220 and short slot 220 intersecting long slot 218 forwardly of a center point 222 of long slot 218. Each opening 216 is thus configured to allow passage of two adjacent links of chain 126 at the intersection between short slot 218 and long slot 220, but to prevent passage of to adjacent links of chain 126 when chain 126 is slid rearwardly along long slot 218. In this way, chains 126 may be easily secured to or removed from mounting apparatus 200 without requiring any tools and, yet, remain securely trapped in mounting plate 202 when mounting apparatus 200 is pulled forward. Mounting plate 202 is secured to a pulling device, such as backreamer 26, at a forward end thereof by any suitable means, such as a clamp fastener 224.

FIG. 15 shows one method of simultaneously installing several underground pipes 116 in a pre-bored hole using mounting apparatus 200. The method comprises positioning backreamer 26 in the hole, connecting backreamer 26 to mounting apparatus 200, securing a front end of each pipe 116 to a rear portion of pulling apparatus 100, attaching pulling chain 126 to each pulling apparatus 100, and securing each pulling apparatus 100 to mounting apparatus 200 by sliding its respective chain 126 into one of crucifix-shaped openings 216. Finally, pulling backreamer 26 draws pipes 116 side by side into the hole behind backreamer 26.

It will be understood that the foregoing description is of preferred exemplary embodiments of the invention, and that the invention is not limited to the specific forms shown, but is limited only by the scope of the invention as expressed in the appended claims.

We claim:

1. An apparatus for installing an underground pipe in a hole, comprising:

a plug having a rear cylindrical portion with external threads and a front portion having a device for attachment of the plug to a pulling device; and a plastic pipe section having a front portion with internal threads secured to the external threads of the rear portion of the plug, a rear portion of the pipe section extending beyond the rear portion of the plug.

2. An apparatus as recited by claim 1, wherein the internal threads of the pipe section are precut prior to coupling with the plug.

3. An apparatus as recited by claim 1, wherein the rear portion of the pipe section further comprises a radial wall located in the interior of the pipe section rearwardly of the internal threads, which wall forms a seal permitting pressurization of a portion of the interior of the pipe section rearwardly the wall.

4. An apparatus as recited by claim 3, wherein the rear portion of the pipe section further includes an outwardly opening, radially extending hole for accepting a torque rod, the hole located forwardly of the radial wall pressure seal.

5. An apparatus as recited by claim 1, wherein the plug further comprises a collar secured around an outer circumference of the rear portion, which collar forms a stop for a forward edge of the pipe section.

6. An apparatus for installing an underground pipe in a hole, comprising a plug having:

a rear frustoconical portion with external threads;

a lengthwise external cutaway portion on the rear portion forming an edge for cutting into an interior surface of a plastic pipe so that the external threads become engaged with the interior surface of the plastic pipe;

a first slot extending radially through the rear portion of the plug suitable for collecting pieces of plastic cut from the pipe; and a front portion having a mounting device for attachment of the plug to a first pulling chain.

7. An apparatus as recited by claim 6, wherein the first slot opens rearwardly.

8. An apparatus as recited by claim 7, wherein the first slot includes a mounting device for attachment of the plug to a second pulling chain.

9. An apparatus as recited by claim 7, wherein front portion of the plug has a second, frontwardly opening slot spaced from and substantially coplanar with the first slot, and a frontwardly opening blind hole centered on the second slot, the second slot and blind hole being configured for insertion of the first pulling chain therein so that the first pulling chain fits therein, and the front portion of the plug further has an outwardly opening, radially extending hole for receiving a fastener configured for insertion into a link of the first pulling chain disposed in the second slot and blind hole for securing the first pulling chain therein.

10. An apparatus for simultaneously installing several underground pipes in a pre-bored hole, comprising a mounting plate having:

a generally flat plate including a plurality of spaced, crucifix-shaped openings extending therethrough, each opening configured to allow passage of a chain at a first portion and to prevent passage of a chain at a second portion, the second portion located rearwardly of the first portion; and a means for securing a front end of the flat plate to the back end of a backreamer.

11. An apparatus as recited by claim 10, wherein each crucifix is formed by a long slot extending in a lengthwise direction and a short slot extending in a widthwise direction, the long slot bisecting the short slot, the short slot intersecting the long slot along a forward portion of the long slot.

12. A method for installing an underground pipe in a hole, comprising:

securing a pipe section having internal threads formed at one end thereof to a pipe to be installed in the hole;

threadedly securing the front end of the pipe section to a rear cylindrical portion of a plug, the rear portion having external threads engageable with the internal threads of the pipe section;

attaching a pulling device to a mounting device on a front portion of the plug; and then pulling the plug with the pulling device in order to draw the pipe into the hole.

13. The method as recited by claim 12, wherein the pipe and the pipe section are made of plastic, and the securing step comprises welding the pipe to the pipe section at an end thereof remote from the internal threads.

14. A method for simultaneously installing several underground pipes in a pre-bored hole, comprising:

positioning a backreamer in the hole, the backreamer connected to generally flat, rearwardly extending mounting plate, which plate has a number of spaced openings therein;

securing a front end of each plastic pipe to a rear portion of a plug;

attaching a pulling chain to a mounting device on a front portion of each plug;

securing each chain by sliding it into one of the openings in the mounting plate; and pulling the backreamer through the hole so that the pipes are drawn by the chains side by side through the hole behind the backreamer.

15. The method of claim 14, wherein the openings in the plate are crucifix-shaped.

16. The method as recited by claim 12, further comprising cutting the internal threads into the pipe section prior to securing the pipe section to the plug.

17. The method as recited by claim 16, wherein the pipe and the pipe section are made of plastic, and the securing step comprises welding the pipe to the pipe section at an end thereof remote from the internal threads.

* * * * *